United States Patent
Wang et al.

(10) Patent No.: US 10,491,697 B2
(45) Date of Patent: Nov. 26, 2019

(54) SYSTEM AND METHOD FOR BOT DETECTION

(71) Applicant: Cognant LLC, Mountain View, CA (US)

(72) Inventors: Heng Wang, San Jose, CA (US); Owen S. Vallis, Santa Clara, CA (US); Arun Kejariwal, Fremont, CA (US); Harsh Singhal, Sunnyvale, CA (US); William Hatzer, San Jose, CA (US); James Koh, Pasadena, CA (US)

(73) Assignee: Cognant LLC, Mountain View, CA (US)

( * ) Notice: Subject to any disclaimer, the term of this patent is extended or adjusted under 35 U.S.C. 154(b) by 0 days.

(21) Appl. No.: 16/275,738

(22) Filed: Feb. 14, 2019

(65) Prior Publication Data

US 2019/0253504 A1    Aug. 15, 2019

Related U.S. Application Data

(60) Provisional application No. 62/630,880, filed on Feb. 15, 2018.

(51) Int. Cl.
*G06F 15/173*    (2006.01)
*H04L 29/08*    (2006.01)
(Continued)

(52) U.S. Cl.
CPC ............. *H04L 67/22* (2013.01); *A63F 13/73* (2014.09); *H04L 63/1483* (2013.01); *H04L 67/16* (2013.01); *A63F 2300/532* (2013.01)

(58) Field of Classification Search
USPC ....... 709/203, 206, 217, 219, 223, 224, 225, 709/226, 228, 230, 232, 238; 705/14.1;
(Continued)

(56) References Cited

U.S. PATENT DOCUMENTS 8,473,336 B1 *   6/2013   Simmons ............... G06Q 30/00
                                                   705/14.1
8,997,226 B1     3/2015   Call et al.
(Continued)

FOREIGN PATENT DOCUMENTS

WO   WO-2009/132148 A2   10/2009
WO   WO-2017/007936 A1    1/2017
WO   WO-2017/027320 A1    2/2017

OTHER PUBLICATIONS

Int'l Search Report and Written Opinion of the ISA/EP in PCT/US2019/017968 dated May 13, 2019, 13 pgs.

*Primary Examiner* — Quang N Nguyen
(74) *Attorney, Agent, or Firm* — Goodwin Procter LLP

(57) ABSTRACT

A method, a system, and an article are provided for detecting bot users of a software application. An example method can include: providing a client application to a plurality of users; obtaining device-based data and application-based data for each user, the device-based data including a description of at least one computer component used to run the client application, the application-based data including a history of user interactions with the client application; aggregating the data to obtain a plurality of bot signals for each user; analyzing the bot signals to detect a bot among the plurality of users; and preventing the bot from accessing the client application.

20 Claims, 6 Drawing Sheets

(51) Int. Cl.
*A63F 13/73* (2014.01)
*H04L 29/06* (2006.01)

(58) Field of Classification Search
USPC .............................................. 726/7
See application file for complete search history.

(56) References Cited

U.S. PATENT DOCUMENTS

| | | | |
|---|---|---|---|
| 9,420,049 B1* | 8/2016 | Talmor | H04L 67/02 |
| 2016/0112538 A1* | 4/2016 | Wo | H04L 67/32 |
| | | | 709/225 |
| 2016/0149919 A1* | 5/2016 | Gauthier | H04L 63/10 |
| | | | 726/7 |
| 2018/0069963 A1* | 3/2018 | Chen | H04L 63/083 |
| 2018/0115556 A1* | 4/2018 | Otsubo | G06F 21/6209 |
| 2019/0141125 A1* | 5/2019 | Ogrinz | H04L 67/1091 |

* cited by examiner

SYSTEM AND METHOD FOR BOT DETECTION

CROSS-REFERENCE TO RELATED APPLICATIONS

This application claims the benefit of U.S. Provisional Patent Application No. 62/630,880, filed Feb. 15, 2018, the entire contents of which are incorporated by reference herein.

BACKGROUND

The present disclosure relates generally to bot detection and, in certain examples, to systems and methods for detecting and managing bot users of a client application or other software application.

The growing mobile application landscape presents an opportunity for users to create automated programs or "bots" that engage with the applications on their behalf. These bots can be created for a variety of reasons and can influence the mobile application in a number of ways. Some bots are created to perpetrate fraud or to generate spam, and such bots can negatively impact the application experience of legitimate users. Other bots can be created to support one or more users (e.g., by automating time-consuming tasks) and may actually increase overall user engagement within the application. It is desirable for a software application developer or provider to be able to identify and classify bots so that the influence of the bots can be analyzed and any necessary corrective action can be taken.

SUMMARY

In general, the subject matter of this disclosure relates to detecting bot users of a software application, such as a client application (e.g., for a multiplayer online game). In one example, a client application is provided to a group of users and data is collected for each user in the group. The data can include, for example, device-based data that describes software and/or hardware used by the users to interact with the client application. Alternatively or additionally, the data can include application-based data that describes user interactions with the client application. The data is then processed to determine a plurality of bot signals for each user. Each bot signal can be or include a value that can be indicative of bot behavior or bot characteristics. The bot signals for each user can then be converted into a set of probability values that indicate whether or not the user is a bot. The bot probability values can be combined to generate a final bot score for each user, which can be or include an estimated probability that the user is a bot.

Advantageously, implementations of the systems and methods described herein can automatically detect bots using a behavioral model of user engagement and application metrics. The model makes it possible to detect suspicious users whose engagement with the client application deviates from expected user behavior. In some instances, multiple signals can be combined to provide a more robust signal for bot detection. Additionally, any detected bots can be grouped according to how the bots engage with the client application. This can facilitate bot analysis and provide insight into the motivations of bot creators and the effects the bots may be having on the application ecosystem.

In one aspect, the subject matter described in this specification relates to a method (e.g., a computer-implemented method). The method includes: providing a client application to a plurality of users; obtaining device-based data and application-based data for each user, the device-based data including a description of at least one computer component used to run the client application, the application-based data including a history of user interactions with the client application; aggregating the data to obtain a plurality of bot signals for each user; analyzing the bot signals to detect a bot among the plurality of users; and preventing the bot from accessing the client application.

In certain examples, the client application can include a multiplayer online game. The at least one computer component can include client device hardware and/or client device software. Analyzing the bot signals can include determining that a user is a bot based on an incompatible combination of a client device model and an operating system version. Analyzing the bot signals can include determining that a user is a bot based on (i) a number of distinct geographical login locations used by the user and/or (ii) a number of distinct Internet Protocol addresses used by the user. Analyzing the bot signals can include determining that a user is a bot based on a repeating pattern of activity in the user's history of user interactions with the client application.

In some instances, analyzing the bot signals can include determining that a user is a bot based on a lack of social interactions with other users in the client application. Analyzing the bot signals can include determining that a user is a bot when a client device for the user is associated with an anomalous pattern of calls to an application programming interface for the client application. Analyzing the bot signals can include determining that a user is a bot based on a similarity between one of the user's signals and a corresponding signal for a different user. Analyzing the bot signals can include using a sigmoid function to calculate a confidence score that provides or includes an indication that at least one user is a bot.

In another aspect, the subject matter described in this specification relates to a system having one or more computer processors programmed to perform operations including: providing a client application to a plurality of users; obtaining device-based data and application-based data for each user, the device-based data including a description of at least one computer component used to run the client application, the application-based data including a history of user interactions with the client application; aggregating the data to obtain a plurality of bot signals for each user; analyzing the bot signals to detect a bot among the plurality of users; and preventing the bot from accessing the client application.

In certain implementations, the client application can include a multiplayer online game. The at least one computer component can include client device hardware and/or client device software. Analyzing the bot signals can include determining that a user is a bot based on an incompatible combination of a client device model and an operating system version. Analyzing the bot signals can include determining that a user is a bot based on (i) a number of distinct geographical login locations used by the user and/or (ii) a number of distinct Internet Protocol addresses used by the user. Analyzing the bot signals can include determining that a user is a bot based on a repeating pattern of activity in the user's history of user interactions with the client application.

In some examples, analyzing the bot signals can include determining that a user is a bot based on a lack of social interactions with other users in the client application. Analyzing the bot signals can include determining that a user is a bot when a client device for the user is associated with an anomalous pattern of calls to an application programming interface for the client application. Analyzing the bot signals can include determining that a user is a bot based on a similarity between one of the user's signals and a corresponding signal for a different user. Analyzing the bot signals can include using a sigmoid function to calculate a confidence score that provides or includes an indication that at least one user is a bot.

In another aspect, the subject matter described in this specification relates to an article. The article includes a non-transitory computer-readable medium having instructions stored thereon that, when executed by one or more computer processors, cause the computer processors to perform operations including: providing a client application to a plurality of users; obtaining device-based data and application-based data for each user, the device-based data including a description of at least one computer component used to run the client application, the application-based data including a history of user interactions with the client application; aggregating the data to obtain a plurality of bot signals for each user; analyzing the bot signals to detect a bot among the plurality of users; and preventing the bot from accessing the client application.

Elements of embodiments described with respect to a given aspect of the invention can be used in various embodiments of another aspect of the invention. For example, it is contemplated that features of dependent claims depending from one independent claim can be used in apparatus, systems, and/or methods of any of the other independent claims

DETAILED DESCRIPTION

Figure 1:
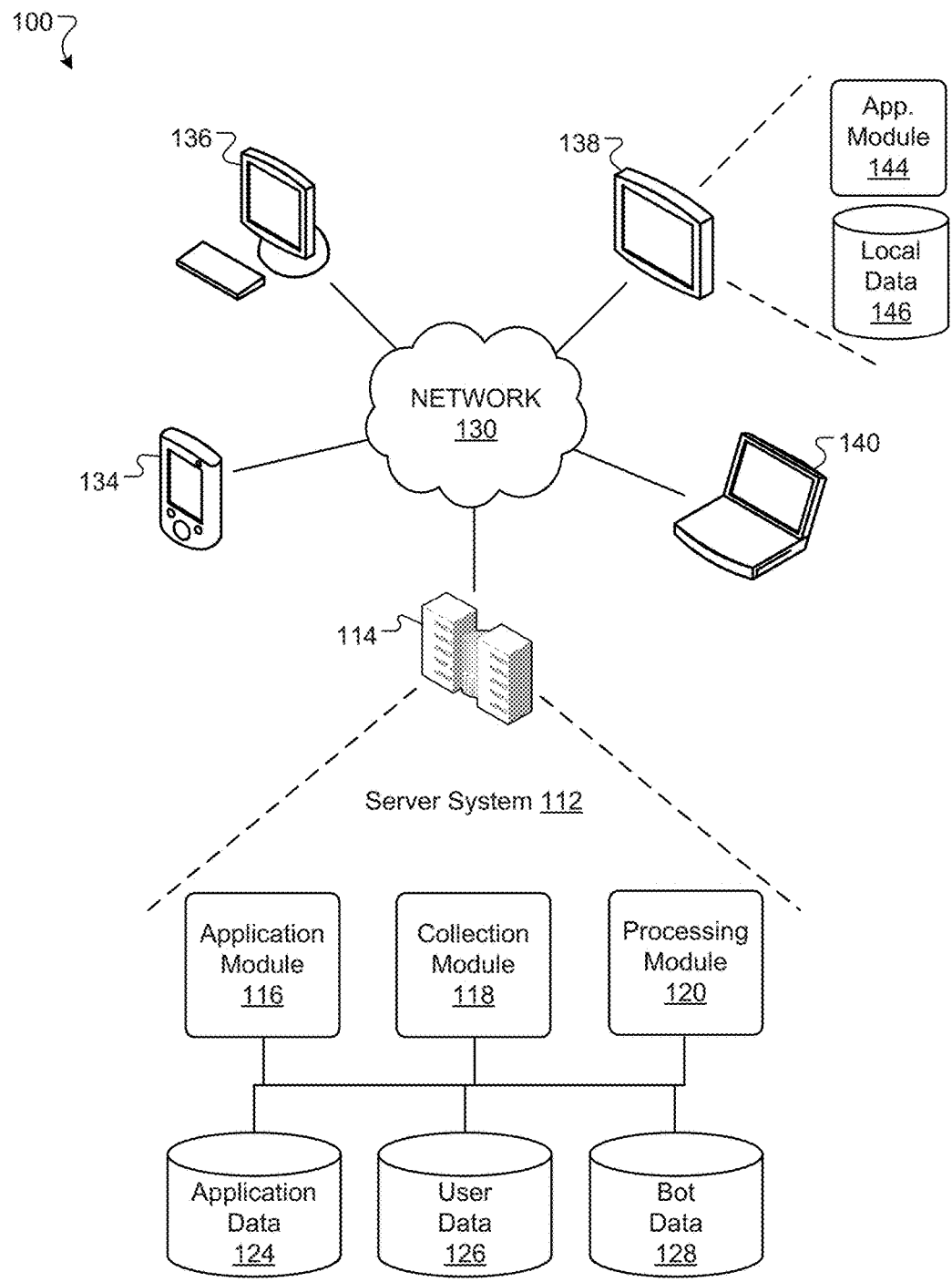
FIG. 1 is a schematic diagram of an example system for detecting bots.

In the context of software applications (also referred to herein as "apps"), such as mobile applications and other client applications, bots (also referred to herein as "bot users") are generally scripted programs that automate user engagement with the applications and impact the applications in a variety of ways. Detection of bots can be challenging, as the bots can be configured to emulate the activities of legitimate users in order to avoid detection. There are many motivations for creating such bots, including the creation of virtual users that can be leveraged to benefit a bot owner's primary application account (e.g., in an online game), or automating the application engagement to collect an application promotion or marketing incentive. The use of bots can significantly influence many different aspects of an application, both positively and negatively.

For example, in some instances, a publisher (e.g., a website) that advertises a client application can receive a payment from the client application provider for each new user that the publisher can get to (i) install the application and (ii) achieve a certain level of engagement with the client application (e.g., reaching level 10 in an online game). This arrangement can provide an incentive for publishers to develop bots that automatically install the application and engage with the application long enough to receive the payments from the client application provider. As described herein, such bots can be detected by obtaining and analyzing signals or data such as, for example, early drop off in engagement, anomalous patterns in network metrics, and application usage patterns that significantly deviate from expected usage.

Additionally or alternatively, bots can cause network security problems by reverse engineering an application's application programming interface (API) and engaging with the application in a headless manner, such that the engagement is governed by a computer program rather than a human being's hand and decision-making. For example, a bot user can log in to the application on a daily basis from a programmatic call to the application's API. Depending on the application, this can indicate a breach in the security of the application. Automated detection of such bots can act as a warning for network security teams and suspicious accounts can be removed from the application and/or isolated for further research.

Bots can also present monetization issues for application providers, given that bots typically generate little or no revenue for the application and can require application developers to provide resources that support the bots' usage of the application. This can significantly impact monetization efforts due to both the low revenue collected from bot accounts and the operational cost associated with supporting bot accounts. Advantageously, the systems and methods described herein can allow bots to be detected and categorized by bot type. Such groupings can allow the different bot types to be evaluated for lifetime value and overall impact on application revenue.

Additionally or alternatively, bot engagement with client applications is generally of low quality and, depending on the nature of the client application, can degrade the experiences of legitimate application users. In a multiplayer online game, for example, a legitimate user may attempt to engage a bot user in a chat session and may become frustrated when the bot does not respond. Legitimate users may also become frustrated when other users utilize bots to gain an unfair advantage, for example, by providing points or resources to the other users' primary accounts. The bots can appear on the surface to be active users, but the bots' pattern of engagement can deviate from the behavior of real users, and this can result in an application environment that is less than ideal and/or unfair to real or legitimate users.

In general, the systems and methods described herein are directed to automated techniques for detecting bots using user engagement and application metrics, and, more particularly, to techniques that employ a behavioral model of mobile application metrics to efficiently detect and label suspicious usage of an application. The behavioral model allows for both the identification of users that significantly deviate from the expected application usage, as well as the classification of suspicious users into various bot groups based on user engagement. User behavior can be modeled or analyzed using a number of different metrics that are transformed into signals and provided as input to the behavioral model. More particularly, the behavioral model can be derived from or can receive as input a number of different signals with expected ranges. The signals for a user can be or include, for example, number of unique IP addresses, number of IP addresses associated with a data center (e.g., AWS or Google Cloud), type of CPU, application tutorial completion times, duplicate or similar email addresses, number of users sharing the same IP address during application usage, total application usage time, total spend or purchases in the application, and the like. The model can be used to identify bot users based on deviations between the users' behavior and/or device data (e.g., hardware or software) and expected or typical user behavior and/or device data. In general, the model can rely on computational techniques that capture usage and engagement patterns of normal users.

Additionally or alternatively, the models can classify suspected bots into separate groups based on engagement. This automatic grouping can provide fine-grained analysis of the impact of the bots on the application environment and can help application providers understand the motivations of bot developers.

In preferred implementations, bot detection can begin by segmenting application users into groups or cohorts based on, for example, an installation date or a date of first use of the application. For example, all users who installed or began using the application on a specified day (e.g., 1, 3, 8, or 20 days earlier) can be put in a cohort and analyzed together. Grouping the users in this manner can ensure that a consistent amount of engagement data is gathered for each user, which can help reveal clear user behavior patterns and improve model accuracy. On the other hand, cohort creation can induce a delay in obtaining model results, given that user data is collected for a period of time before the behavioral model can be run. This creates a trade-off between reporting latency and the accuracy or descriptive power of the behavioral models. For example, if early bot detection is a priority, then the cohort of users can be analyzed shortly after the users began using the client application (e.g., within 1 or 2 days). Alternatively, if prediction accuracy is a priority, then the cohort of users can be analyzed several or many days after the users began using the client application (e.g., after 20 or 30 days). A longer time period can be useful for collecting accurate data and/or training the behavioral models. Additionally or alternatively, the amount of latency incurred can depend on user behavior patterns for each application. For example, if most users actively engage with an application during a first day of use, then it may be possible to collect sufficient user data and run the model within that first day.

In various examples, bots can be detected within a cohort by comparing signals for each user in the cohort. Any user whose signals deviate significantly from the signals of other users can be considered to be a bot. Additionally or alternatively, bots can be detected by comparing the signals with historical signals from other cohorts and/or from other client applications. This can allow suspicious bot behavior to be detected in a variety of different applications, while minimizing an amount of domain knowledge required to setup and tune the models. In some instances, bots can be detected by comparing behavioral patterns and/or application metrics of a new user with the behavioral patterns and/or application metrics of known bots or bad actors. The behavioral patterns and/or application metrics can be encoded in a digital signature (e.g., a vector or a hash) that enables fast searching for similar signatures within a large database of known bots.

FIG. 1 illustrates an example system 100 for detecting and managing bot users of a client application or other software application. A server system 112 provides functionality for collecting and processing data related to user client devices and user engagement with the client application. The server system 112 includes software components and databases that can be deployed at one or more data centers 114 in one or more geographic locations, for example. In certain instances, the server system 112 is, includes, or utilizes a content delivery network (CDN). The server system 112 software components can include an application module 116, a collection module 118, and a processing module 120. The software components can include subcomponents that can execute on the same or on different individual data processing apparatus. The server system 112 databases can include an application data 124 database, a user data 126 database, and a bot data 128 database. The databases can reside in one or more physical storage systems. The software components and data will be further described below.

The client application, such as, for example, a client-based and/or web-based software application, can be provided as an end-user application to allow users to interact with the server system 112. The client application can relate to and/or provide a wide variety of functions and information, including, for example, entertainment (e.g., a game, music, videos, etc.), business (e.g., word processing, accounting, spreadsheets, etc.), news, weather, finance, sports, etc. In preferred implementations, the client application provides a computer game, such as a multiplayer online game. The client application or components thereof can be accessed through a network 130 (e.g., the Internet) by users of client devices, such as a smart phone 134, a personal computer 136, a tablet computer 138, and a laptop computer 140. Other client devices are possible. In alternative examples, the application data 124 database, the user data 126 database, the bot data 128 database or any portions thereof can be stored on one or more client devices. Additionally or alternatively, software components for the system 100 (e.g., the application module 116, the collection module 118, and/or the processing module 120) or any portions thereof can reside on or be used to perform operations on one or more client devices.

Additionally or alternatively, each client device in the system 100 can utilize or include software components and databases for the client application. The software components on the client devices can include an application module 144, which can implement or provide the client application on each client device (e.g., the application module 144 can be the client application or portions thereof). The databases on the client devices can include a local data 146 database, which can store data for the client application and exchange the data with the application module 144 and/or with other software components for the system 100, such as the collection module 118. The data stored on the local data 146 database can include, for example, user history data, user transaction data, image data, video data, audio data, and/or any other data used or generated by the system 100. While the application module 144 and the local data 146 database are depicted as being associated with the tablet computer 138, it is understood that other client devices (e.g., the smart phone 134, the personal computer 136, and/or the laptop computer 140) can include the application module 144, the local data 146 database, or any portions thereof.

FIG. 1 depicts the application module 116, the collection module 118, and the processing module 120 as being able to communicate with the application data 124 database, the user data 126 database, and the bot data 128 database. The application data 124 database generally includes application data used to implement the client application on the system 100. The application data can include, for example, image data, video data, audio data, application parameters, initialization data, and/or any other data used to run the client application. The user data 126 database generally includes data related to the users of the client application. Such data can include, for example, user characteristics (e.g., geographical location, gender, age, and/or other demographic information), client device characteristics (e.g., device model, device type, platform, and/or operating system), and/or a history of user activity that occurred prior to, during, or after installation of the client application on the client devices. The history of user activity can include, for example, user inputs to the client devices, user messages, user achievements or advancements (e.g., in an online game), user engagements with other users, user assets, user purchases, user sales, and/or similar activity. In the context of an online game, the history of user activity can include a record of any purchases made by players, for example, to acquire virtual items, additional lives, new game features, or some other advantage. The bot data 128 database generally includes information related to any bots that have been detected by the system 100. Such information can be or include, for example, data, signals, features, and/or characteristics describing bot behavior and/or bot computer equipment or algorithms. Information in the bot data 128 database can be used by the system 100 to detect additional bots, for example, based on comparisons of user behavior with known bot behavior.

Figure 2:
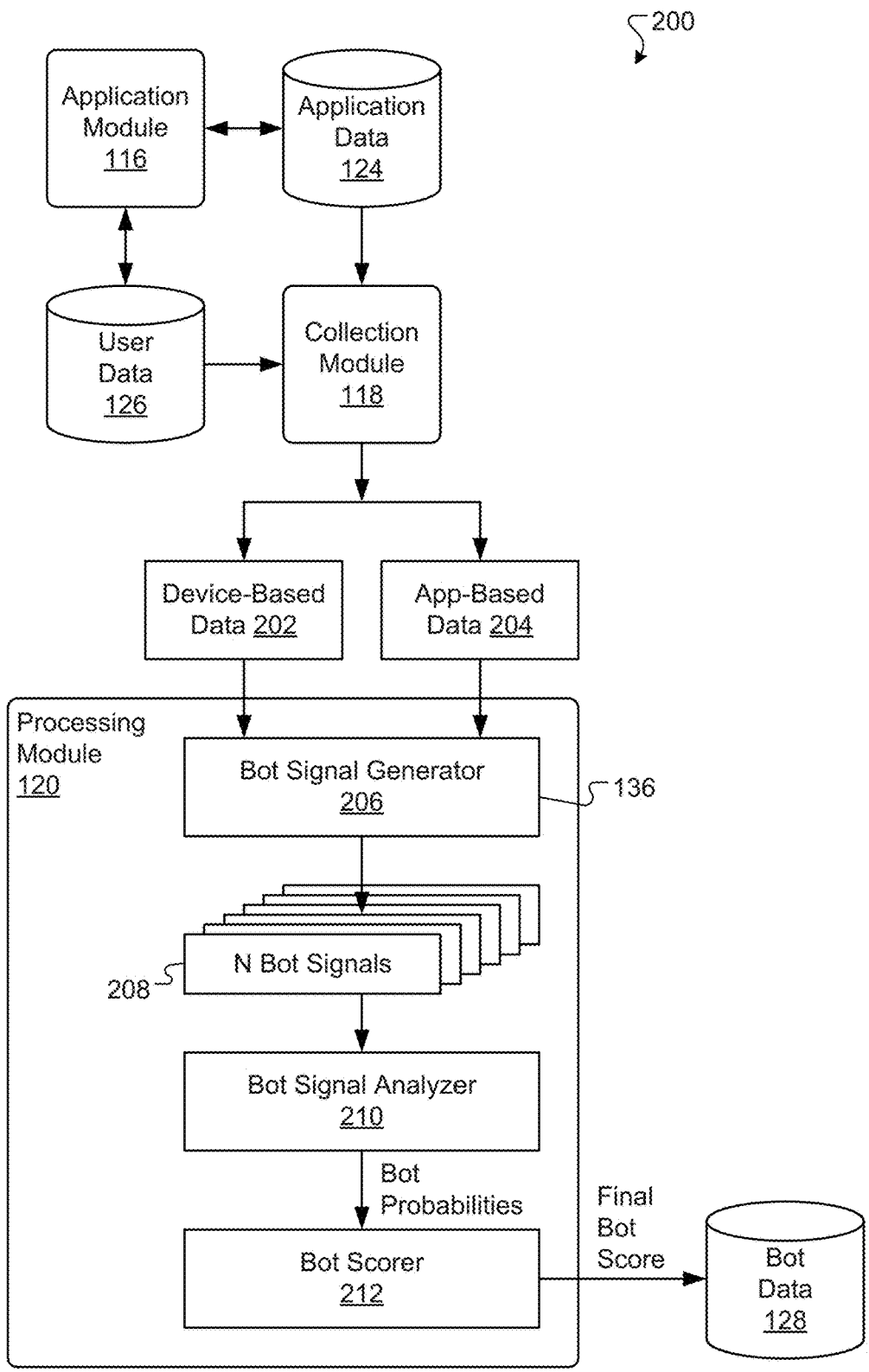
FIG. 2 is a schematic data flow diagram of an example system for detecting bots.

FIG. 2 is a schematic data flow diagram of a method 200 in which the application module 116, the collection module 118, and the processing module 120 are used to detect bot users of a client application. The application module 116 provides the client application to a plurality of users, some of which can be bots. Information related to the client application and/or the users (e.g., client devices, user activities, etc.) can be stored in the application data 124 database and/or the user data 126 database.

The collection module 118 can extract information from the application data 124 database and/or the user data 126 database to generate raw signals for each user and/or for a group of users. In preferred implementations, the information is extracted for a group or cohort of users that recently installed or began using the client application. The cohort of users can be, for example, a group of users that installed or began using the client application during a recent time period, such as a previous day, a previous week, a previous month, or other time period. In one example, the cohort is or includes the users who installed or began using the client application on a certain day, such as a day that occurred a certain number (e.g., 1, 7 or 30) of days ago. Extracting the information can include gathering meta information (e.g., based on user geographic location), client device information, and/or application usage metrics. The collection module 118 can preprocess the collected information and/or aggregate the information by user (e.g., according to device ID) or group of users (e.g., a set of data for a 7-day install cohort or a group of users from a previous week).

In certain examples, the information obtained by the collection module 118 can be or include device-based data 202 and/or application-based data 204. Examples of device-based data 202 and application-based data 204 are presented in Tables 1 and 2, respectively, along with brief descriptions of how these signals can be used (e.g., by behavioral models in the processing module 120) to detect bots. Device-based data 202 can be or include, for example, data or information that describes computer equipment (e.g., client device hardware or software) used by users to access and/or interact with the client application. Application-based data 204 can be or include, for example, data or information related to user engagement with the client application and other users of the client application.

Device-based data 202 can be used to detect bots in various ways. For example, a user who exhibits any of the following can have a higher probability of being a bot: the user is identified as having a device model and/or an operating system that do not exist or are incompatible with one another; the user repeatedly logs in from different geographical locations (e.g., countries or cities); the user utilizes IP addresses associated with known bots; the user accesses the client application from a large number of IP addresses; and/or the user utilizes an IP address used by multiple other users. Other types of device-based data 202 and methods of using such signals to detect bots are possible.

TABLE 1

Examples of device-based data and indications of bot users.

| Device-Based Data | Behavior Indicative of Bot User |
|---|---|
| Client Device Model | Device model does not exist; or device is a desktop computer |
| Client Device Processor Type | Processor is associated with a machine type (e.g., a desktop computer or a mobile device) that most users do not use to run the application |
| Operating System Type or Version | Operating system or version does not exist or is incompatible with device model or processor |
| Geographical Location (e.g., country or city) | User repeatedly logs in from different countries |
| Email Address | User's email address string has high similarity to email address string for at least one other user |
| Internet Protocol (IP Address) | User utilizes IP address associated with known bots; user accesses the client application from a large number of IP addresses; or the IP address has a large number of users |

Likewise, application-based data 204 can be used to detect bots in various ways. For example, a user who exhibits any of the following behavior can have a higher probability of being a bot: the user logs in to the client application at regular intervals (e.g., every 10 hours or at exactly the same time each day); the user never logs out of the client application and/or engages with the application continuously (e.g., 24 hours a day); the user makes a small in-app purchase shortly after installing the client application but makes no subsequent purchases; the user engages with the application in regular patterns (e.g., the same action is repeated at identical times or intervals, as if happening on a timer); the user has high application engagement but does not interact with other users or engage with any social features of the client application (e.g., chat); the user completes in-app goals (e.g., for an online game) at unusual times or rates; the user completes in-app goals at or around the same time (e.g., within 5 or 10 seconds) when other users (e.g., using the same IP address) complete the same goals; and/or the user's client device is missing low level API calls (e.g., indicative of partial API implementation to run a headless bot). Other types of application-based data 204 and methods of using such data to detect bots are possible.

TABLE 2

Examples of application-based data and indications of bot users.

| Application-Based Data | Behavior Indicative of Bot User |
|---|---|
| Login Timestamps | User logs in to client application at regular intervals or consistent times; or user never logs out and/or engages with the client application continuously (e.g., 24 hours a day) |
| Transaction History | User makes one small in-app purchase early on but makes no subsequent purchases |

TABLE 2-continued

Examples of application-based data and indications of bot users.

| Application-Based Data | Behavior Indicative of Bot User |
|---|---|
| In-App Activity Timestamps | User performs in-app actions at consistent times or intervals (e.g., as if on a timer); or user engages in repeating pattern of in-app activity |
| Interactions with Other Users | User does not interact (e.g., chat) with other users |
| Time to Complete Goals | User completes in-app goals or levels (e.g., for an online game) at unusual times or rates; or two or more users share an IP address and complete goals within short time period of one another |
| Time to Complete App Tutorial | User completes steps of tutorial at an unusual rate or in a manner consistent with known bot behavior |
| API Calls | User is missing low level API calls |

Figure 3:
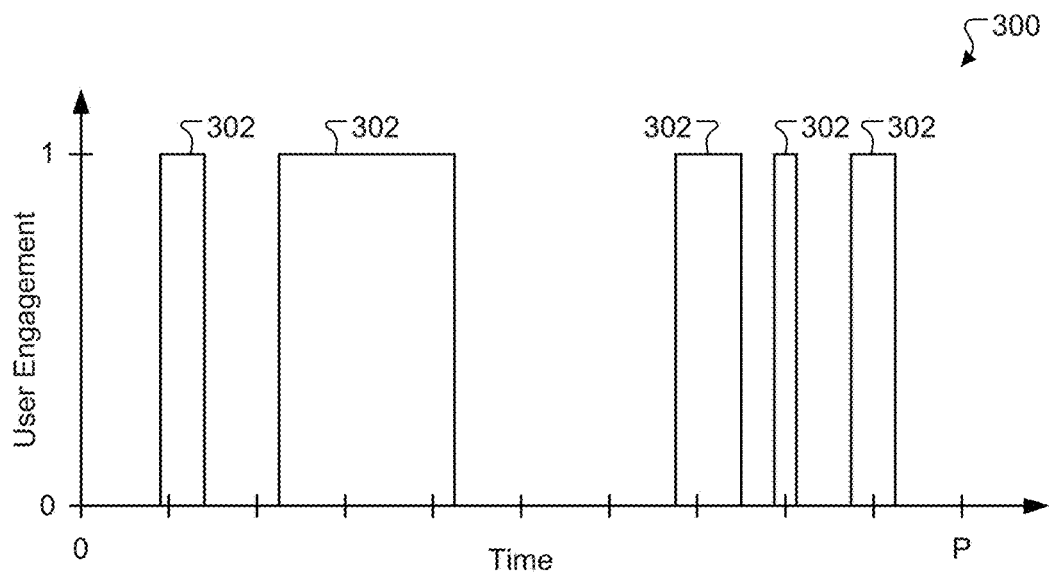
FIG. 3 is a timeline of an example time history of user engagement with a software application.
Figure 4:
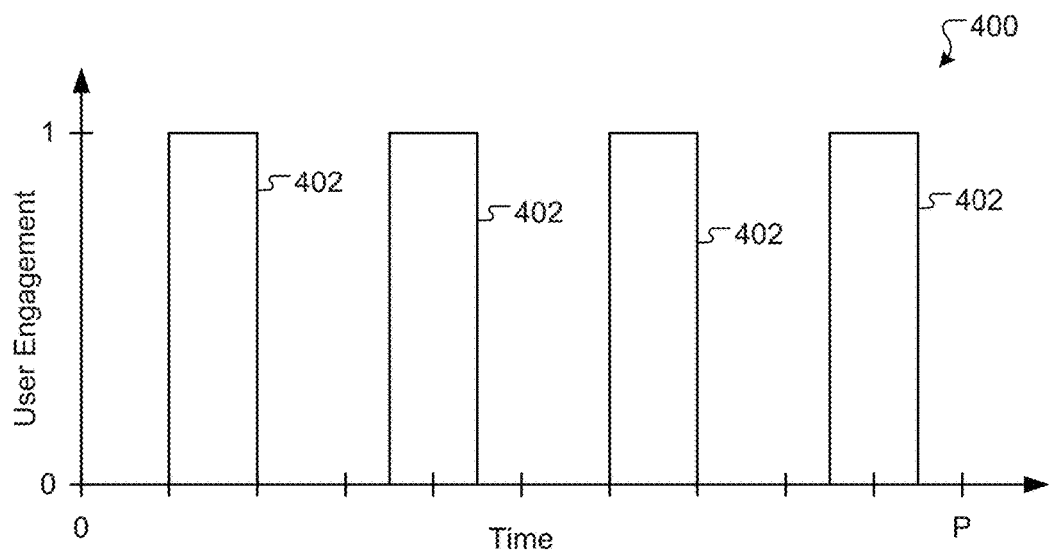
FIG. 4 is a timeline of an example time history of bot engagement with a software application.

For example, FIGS. 3 and 4 include plots 300 and 400, respectively, of user engagement with a client application during a time period P. The plot 300 illustrates user engagement for a real user who logs in to the client application or uses the client application at irregular times and/or for irregular periods of time 302. In this case, the real user can log in to and out of the client application at different times each day. By contrast, the plot 400 illustrates user engagement for a bot user who logs in to the client application or uses the client application at regular times and/or for regular periods of time 402. For example, the bot user can log in to the client application at the same time each day (or other time interval) and/or use the client application for a consistent amount of time before logging off. In general, a user who engages with the client application in a regular or repeating pattern is more likely to be a bot.

Referring again to FIG. 2, the collection module 118 provides the device-based data 202 and the application-based data 204 to the processing module 120, which can process and analyze the data (e.g., using behavioral models) to detect bots among the users of the client application. A bot signal generator 206 in the processing module 120 can receive the data and generate one or more bot signals 208 (alternatively referred to as "summary values") that take into account one or more values for the data (e.g., during a previous time period). For example, when multiple data points are obtained for a user who began using the client application within a previous week, a corresponding bot signal 208 can represent the multiple data points as a single value or multiple values. In preferred examples, the bot signals 208 can be generated separately for each user, so that each user is associated with a collection of bot signals 208, based on the original device-based data 202 and application-based data 204. Each bot signal 208 can be derived from any portion of the device-based data 202, any portion of the application-based data 204, or any combination of the device-based data 202 (e.g., device type and operating system) and/or the application-based data 204. A bot signal 208 can be or include, for example, an average, a maximum, a minimum, or a median value for the device-based data 202 and/or the application-based data 204.

In some examples, the bot signals 208 can be generated by transforming the device-based data 202 and application-based data 204 using summary statistics. This step can include combining several signals (e.g., device model and operating system) into a single signal, searching historical data for similarities between the signals and signals from known bots, and/or comparing signals for users within a group of users. For example, one bot signal 208 can be or include the number of users in the group who shared the same IP address within the last week. In certain examples, the bot signal generator 206 can generate and output N bot signals 208 for each user, where N can be any positive integer (e.g., 2, 5, 10, 20, 50, 100, or more). A bot signal 208 can be or include, for example, a binary signal (e.g., 0 or 1, or "yes" or "no") or a continuous signal (e.g., any real number). Examples of bot signals 208 for a client application are presented in Table 3. Other types of bot signals are possible.

TABLE 3

Examples of bot signals.

| Bot Signal | Signal Type | Possible Values |
|---|---|---|
| x86 Processor | Binary | Yes/No |
| Missing low-level API calls | Binary | Yes/No |
| Device and OS compatible | Binary | Yes/No |
| User Social Interaction with Other Users | Binary | Yes/No |
| Email Address Similarity Measurement | Continuous | Any Real Number ≥ 0 |
| Number of Countries for Logins | Continuous | Any Integer ≥ 1 |
| Number of Data Center IP Addresses | Continuous | Any Integer ≥ 0 |
| Total Application Engagement Time | Continuous | Any Real Number ≥ 0 |
| Cosine Distance for Tutorial Completion Vector | Continuous | Any Real Number ≥ 0 |

The bot signals 208 can be provided from the bot signal generator 206 to a bot signal analyzer 210, which can transform or convert each bot signal 208 into a predicted probability that the associated user is a bot (also referred to as a "bot probability"). The bot signal analyzer 210 can, in some examples, generate bot probability $p_i$ values based on a comparison of bot signal values against a historical database of known bots using suitable efficient search methods, such as, for example, local sensitive hashing or the like. The method of comparison can depend on the bot signal. In some instances, for example, the bot signal analyzer 210 can create a vector in which each element represents a time it took a user to complete a step of a tutorial for the client application. A cosine distance can then be determined between the user's vector and corresponding vectors for known bots. The cosine distance can reveal whether the user's behavior during the tutorial was similar to known bot behavior. Cosine distances can be calculated for other bot signals in a similar manner. Similarly, for user email addresses, the bot signal analyzer 210 can generate a hash of a user's email address to quickly search for email address strings for other users that are similar, for example, based on a similarity measure such as a Jaccard distance or the like. The similarity measurement can be a bot signal for the user's email address. If the user's email address is similar to another user's email address, the user is generally more likely to be a bot.

In preferred examples, the bot signal analyzer 210 can process each bot signal 208 to determine whether the signal is indicative of bot behavior and can output a set of bot probability $p_i$ values. Additionally or alternatively, when the bot signal analyzer 210 determines that a signal is highly indicative of bot behavior, the bot signal analyzer 210 can label the signal (or the corresponding user) as being associated with a bot. For example, the bot signal analyzer 210 can generate a binary label of "yes" or "no" (or "bot" or "not-bot") for each signal, depending on whether the signal indicates a high probability that the user is a bot (e.g., a device type and CPU mismatch). The determination of a high probability can depend on the signal. In one example involving a binary signal (e.g., processor type), x86 CPUs are generally only found on desktop machines and would therefore likely be emulators when used for a mobile application. In this case, the signal could indicate that the user's processor is incompatible with or unusual for the client application, and the signal could be labeled as "bot" and/or assigned a high bot probability $p_i$. In various instances, the bot signal analyzer 210 can map the value (e.g., 0 or 1) of a binary bot signal to a bot probability $p_i$ value, for example, without comparing the bot signal value to a threshold value. For continuous signals, however, the bot signal analyzer 210 can derive a threshold for a signal by identifying a value where a user distribution suddenly and significantly deviates from expected values, thus indicating a boundary between bots and legitimate users. This can be done by, for example, ranking the users by value and finding a point at which the values deviate from a line that fits most users. The bot signal analyzer 210 can identify bots by searching for a subset of users whose bot signals 208 are outside of the expected values or thresholds for one or more of the signals. In general, a user who has one or more signals that fall outside of the expected range or threshold is more likely to be a bot.

Figure 5:
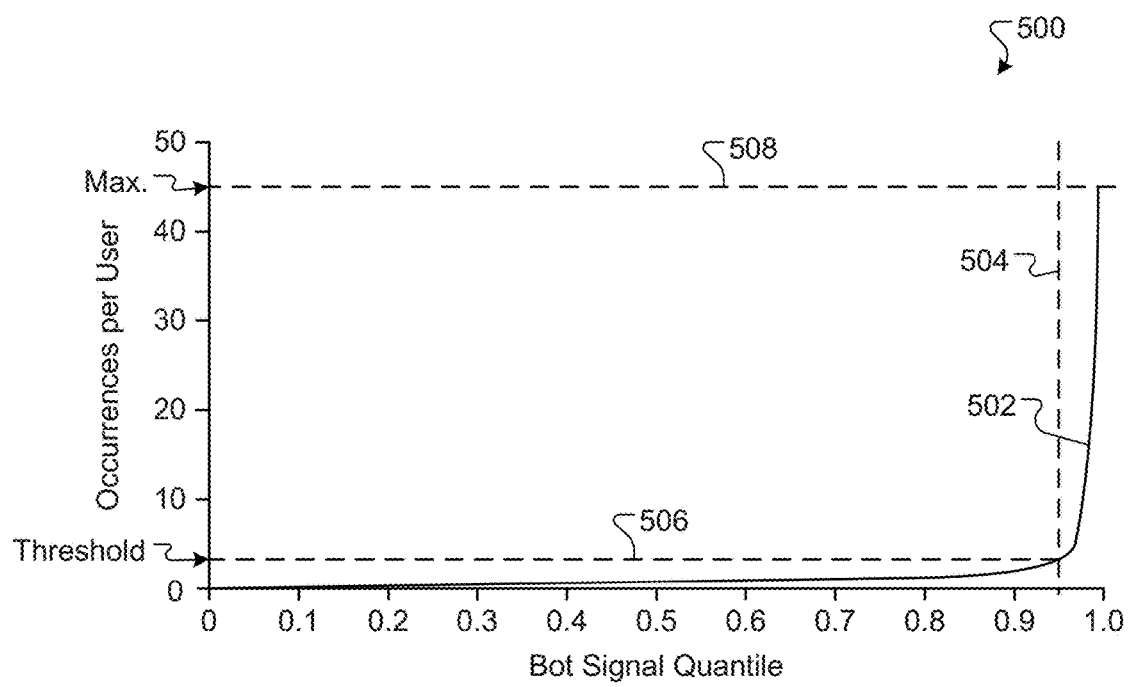
FIG. 5 is a plot of a bot signal distribution for a group of users of a software application.

In some examples, an appropriate threshold for a bot signal 208 can be determined through statistical analysis. FIG. 5 is a plot 500 of a distribution of values for an example bot signal 502 (e.g., number of IP addresses per user) with respect to user quantiles. A threshold value for the bot signal 502 can be defined as a value that separates a small percentage (e.g., 5% or 10%) of the bot signal values from the remaining bot signal values. In the depicted example, a 0.95 (95%) quantile value 504 was chosen, which corresponds to a threshold value 506 of about 3. In other words, 95% of the users in this example can have a bot signal value at or below the threshold value 506 while the remaining 5% of the users can have a bot signal above the threshold value. Other quantile values (e.g., 0.75, 0.9, or 0.97) can be used to determine the threshold. A maximum value 508 for the bot signal in this example is 45. The maximum value 508 can be projected or measured from historical data for the bot signal. For example, historical data for some or all previous users of the client application (e.g., from previous cohorts) can be used to determine appropriate threshold values for bot signals. The thresholds can change over time as more data is collected and bot analyses are performed and reviewed.

Figure 6:
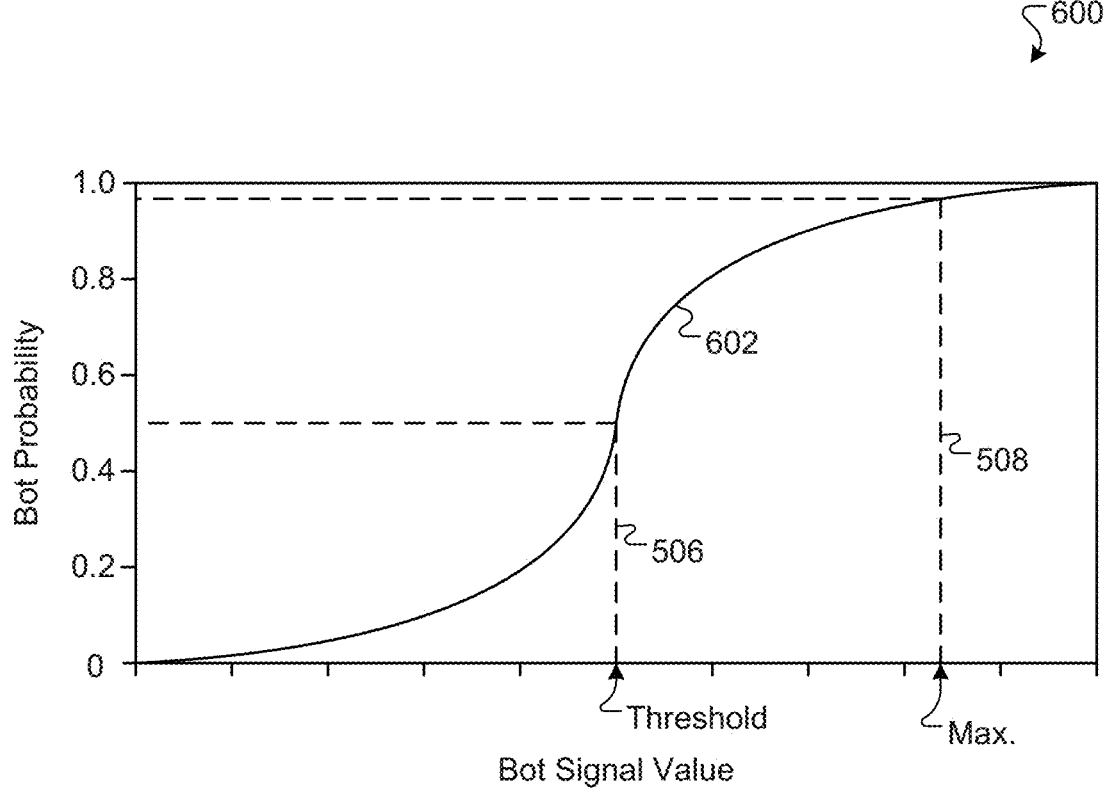
FIG. 6 is a plot of an example sigmoid function for determining bot probability.

In preferred implementations, the bot signal analyzer 210 can calculate a bot probability $p_i$ for each bot signal that reflects a measure of confidence that the corresponding user is a bot. For example, FIG. 6 is a plot 600 of an example sigmoid function 602 that can be used to map a bot signal value for a user to a probability that the user is a bot (i.e., a bot probability $p_i$). In the depicted example, the threshold value 506 for the bot signal can be mapped to a bot probability $p_i$ value of 0.5. In this case, when a user's bot signal value is equal to the threshold value 506, the user can have a 50% chance of being a bot. The maximum value 508 can be mapped to a bot probability $p_i$ value of 0.97 (or other value, such as 0.997). When a user's bot signal value is equal to the maximum value 508, the user can have a 97% chance of being a bot.

Once the bot signals and associated bot probability $p_i$ values have been determined for a user, the bot scorer 212 can process or combine the bot probability $p_i$ values to determine a final bot score for the user, which can be or include a final estimated probability that the user is a bot. The final bot score can derived in several steps. For example, referring again to FIG. 5, a threshold can be derived for each bot signal, for example, by ranking all training examples of the bot signal from smallest to largest and converting the rankings to percentiles of the total number of examples. The threshold (e.g., the threshold value 506) can correspond to the percentile at which the slope of the bot signal breaks significantly (e.g., where a second derivative is at a maximum or minimum value) from most users. This is often found at the 95th percentile (e.g., 0.95 quantile) or greater. Referring again to FIG. 6, bot signal values greater than the threshold can then be mapped to a sigmoid function such that the minimum signal value maps to a bot probability $p_i$ value of 0.5 and some signal value greater than the minimum, but not necessarily the maximum value observed, is mapped to a value of 0.997, which is derived from a normal distribution (e.g., 99.7% of all values should fall within three standard deviations from the mean of the normal deviation). If the sigmoid function 602 is considered to be a cumulative distribution function of a normal distribution, then the "max" value can be mapped to the 0.997 on the sigmoid. This larger second value can be a hyperparameter of the system and can be based on domain knowledge about each signal.

In general, the sigmoid mapping can utilize the following two values: a threshold bot signal value above which a user is considered to be suspicious (e.g., mapped to a bot probability $p_i$ value of 0.5), and a maximum bot signal value for which the bot signal analyzer 210 is extremely confident that the user is a bot (e.g., mapped to a bot probability $p_i$ value of 0.997). For example, the bot signal can be the number of data center (or web hosting) IP addresses associated with the user. The vast majority of users for most client applications of interest do not have a data center IP address, so the threshold value for this bot signal can be set to 1 and the "max" value can be set to 5. In other words, the bot signal analyzer 210 can be extremely confident (e.g., 99.7%) that a user having 5 unique data center IP addresses is a bot. If the user had additional unique data center IP addresses, the level of confidence would not change considerably, given that the bot signal analyzer 210 would still be extremely confident. In general, setting the max value can involve evaluating data for the bot signal and understanding how the bot signal relates to the application usage. For other bot signals, the bot signal analyzer 210 may set a more gradual transition (e.g., a larger difference) between the threshold and the "max" value, for example, when a bot signal value above the threshold can be suspicious but caused by legitimate application usage.

Finally, the bot probability $p_i$ values for the bot signals can be combined into a final bot score for the user, using the following equation:

$$\text{Final Bot Score} = 1 - \Pi(1-p_i). \quad (1)$$

Other equations or approaches can be used to determine the final bot score based on the bot probability $p_i$ values. In general, when one or more bot probability $p_i$ values for a user are high (e.g., near 1.0), the final bot score for the user can also be high. In preferred implementations, some or all bot signals below the minimum threshold (e.g., having bot probability $p_i$ values less than 0.5) can be excluded from the calculation of the final bot score. This can result in users being penalized for suspicious bot signals but not rewarded for signals that align with expected user behavior.

Referring again to FIG. 2, once a user is determined to be a bot, data for the user can be written to the bot data 128 database. The data can include, for example, the device-based data 202, the application-based data 204, the bot signals 208, the bot probability $p_i$ values, and/or the final bot score for the bot user.

In various examples, the bot determinations can be used to address any issues being caused by the bots in or related to the client application. For example, bots who are harming the application experience for other users can be removed from the client application (e.g., by revoking access rights). In some instances, some or all identified bots can be removed from the client application. Additionally or alternatively, steps can be taken to prevent new bots from using the client application. This can involve, for example, using different approaches to acquire new users for the client application. If a portion of the identified bots were acquired through marketing fraud, for example, steps can be taken to avoid or minimize such marketing fraud in the future. For example, steps can be taken to ensure that a fraudulent publisher (e.g., a webpage) is avoided or not used for future marketing. In some instances, a provider of the client application can request a refund (e.g., from fraudulent publishers) for any expenses associated with the bot users.

In certain examples, detected bots can be grouped or clustered according to bot behavior in an effort to understand the influence that bots can have on the client application and/or the motivation behind the creation of the bots. The bot clusters can be generated using various techniques, including nearest neighbor algorithms or other unsupervised clustering approaches. The bot clusters can be built, for example, using the following three types of primary signals: bot score (e.g., combined score based on a weighting of all bot signals), conversion goals (e.g., total revenue generated or completion of key performance indicators), and/or application usage (e.g., total time spent using the client application). In general, clustering can help infer the motivations behind the bot creators and/or can provide a context in which the influence of the bot accounts can be better understood. In a typical example, a majority of the bots in one cluster can exhibit both low application usage and low total goal conversions. Such information can serve to strengthen the confidence that the bot accounts are not legitimate users and/or are negatively impacting the application.

In various implementations, the systems and methods described herein utilize a behavioral model that processes a number of different signals. As the number of signals describing legitimate user engagement increases, it can become more difficult for bots to escape detection. This can be attributed, in part, to an observation that many legitimate users exhibit random or chaotic behavior across various points of engagement within the application, and it can be difficult for bot developers to create bots that mimic or emulate this random or chaotic behavior. Naive implementations of bots can engage with the application in strict patterns that deviate clearly from expected or normal user engagement. Such engagement patterns can include, for example, completing an action every 15 minutes, never logging off, always clicking in an identical order or screen location, and the like. More sophisticated bots can generate random patterns in an effort to emulate normal engagement behavior; however, such bots can be expected to eventually deviate from normal behavior, for example, by completing actions faster than a legitimate user could, or exhibit little to no engagement with other users.

As described herein, the behavioral models (e.g., in the processing module 120) can be configured to detect bots in cohorts of users, which can be defined based on a number of days since the application was installed or first used. Creating cohorts in this manner can enable more direct comparisons among users, which can make it easier to identify any unusual or unexpected user behavior. In alternative examples, user cohorts can be defined based on other characteristics besides installation date, such as, for example, time, events, user location, or user demographics. Cohorts are preferably defined to provide a suitable way of comparing users against an expected behavior or application usage.

In general, the efficacy of the behavioral models described herein can increase as the number of examples of user engagement increases; however, training the models and searching for matching examples of known bots or bad actors can become increasingly difficult as the number of examples becomes too large to fit in memory. The automated bot detection systems and methods described herein can incorporate several approaches to handle such issues and ensure that the behavioral models can benefit from a vast amount of available user data. For example, the systems and methods can leverage distributed computing solutions such as, for example, HADOOP and/or SPARK to enable the use of a (possibly very) large set of historical data. Additionally or alternatively, the system can leverage hashing algorithms, e.g., Local Sensitive Hashing, data clustering, nearest neighbor search, or other suitable hashing or searching algorithms, to efficiently search historical signals for matches with known bots or bad actors, or to surface suspicious patterns within the user data.

In preferred examples, the automated bot detection system described herein can calculate the final bot score (e.g., a weighted sum or other combination of the bot signals 208) to determine if a user is a bot or not. The final bot score can provide a measure of the confidence (e.g., an overall probability) that the user is a bot. This approach of calculating a total score based on a combination of bot signals can make the system readily extensible to new bot signals. Depending on the client application or the context, any portion or subset of bot signals can be combined to determine the total score.

Figure 7:
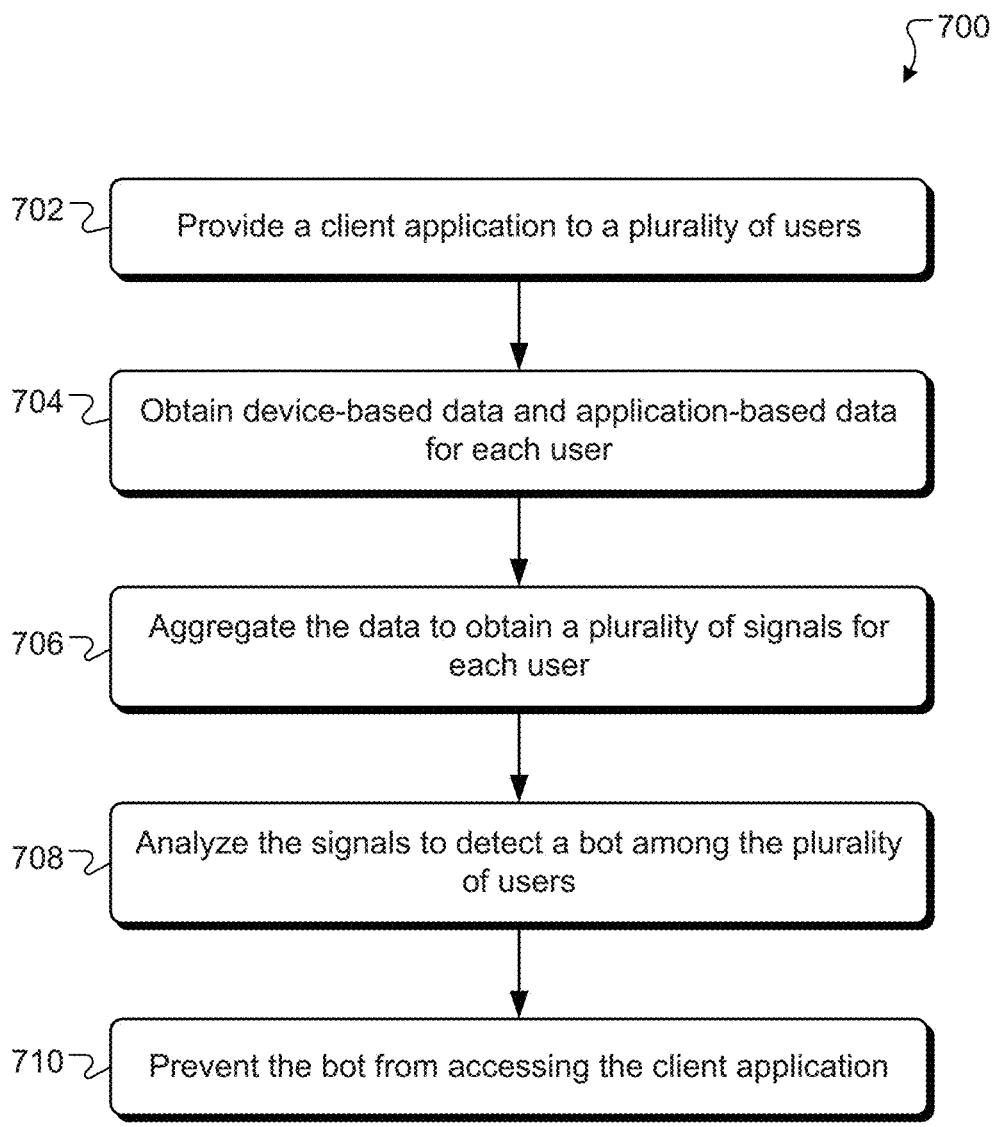
FIG. 7 is a flowchart of an example method of detecting bots.

FIG. 7 illustrates an example computer-implemented method 700 of detecting bot users of a client application. A client application (e.g., a mobile application or other software application) is provided (step 702) to a plurality of users. Device-based data and application-based data are obtained (step 704) for each user. The device-based data is or includes a description of at least one computer component (e.g., client device hardware and/or software) used to run the client application. The application-based data is or includes a history of user interactions with the client application. The data is aggregated (step 706) to obtain a plurality of signals for each user. The signals are analyzed (step 708) to detect a bot among the plurality of users. The bot is prevented (step 710) from accessing the client application.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method, comprising:
   providing a client application to a plurality of users;
   obtaining device-based data and application-based data for each user, the device-based data comprising a description of at least one computer component used to run the client application, the application-based data comprising a history of user interactions with the client application;
   aggregating the data to obtain a plurality of bot signals for each user;
   analyzing the bot signals to detect a bot among the plurality of users; and
   preventing the bot from accessing the client application.

2. The method of claim 1, wherein the client application comprises a multiplayer online game.

3. The method of claim 1, wherein the at least one computer component comprises at least one of client device hardware or client device software.

4. The method of claim 1, wherein analyzing the bot signals comprises:
   determining that a user is a bot based on an incompatible combination of a client device model and an operating system version.

5. The method of claim 1, wherein analyzing the bot signals comprises:
   determining that a user is a bot based on (i) a number of distinct geographical login locations used by the user or (ii) a number of distinct Internet Protocol addresses used by the user.

6. The method of claim 1, wherein analyzing the bot signals comprises:
   determining that a user is a bot based on a repeating pattern of activity in the user's history of user interactions with the client application.

7. The method of claim 1, wherein analyzing the bot signals comprises:
   determining that a user is a bot based on a lack of social interactions with other users in the client application.

8. The method of claim 1, wherein analyzing the bot signals comprises:
   determining that a user is a bot when a client device for the user is associated with an anomalous pattern of calls to an application programming interface for the client application.

9. The method of claim 1, wherein analyzing the bot signals comprises:
   determining that a user is a bot based on a similarity between one of the user's signals and a corresponding signal for a different user.

10. The method of claim 1, wherein analyzing the bot signals comprises:
    using a sigmoid function to calculate a confidence score comprising an indication that at least one user is a bot.

11. A system, comprising:
    one or more computer processors programmed to perform operations comprising:
       providing a client application to a plurality of users;
       obtaining device-based data and application-based data for each user, the device-based data comprising a description of at least one computer component used to run the client application, the application-based data comprising a history of user interactions with the client application;
       aggregating the data to obtain a plurality of bot signals for each user;
       analyzing the bot signals to detect a bot among the plurality of users; and
       preventing the bot from accessing the client application.

12. The system of claim 11, wherein the client application comprises a multiplayer online game.

13. The system of claim 11, wherein the at least one computer component comprises at least one of client device hardware or client device software.

14. The system of claim 11, wherein analyzing the bot signals comprises:
    determining that a user is a bot based on an incompatible combination of a client device model and an operating system version.

15. The system of claim 11, wherein analyzing the bot signals comprises:
    determining that a user is a bot based on (i) a number of distinct geographical login locations used by the user or (ii) a number of distinct Internet Protocol addresses used by the user.

16. The system of claim 11, wherein analyzing the bot signals comprises:
    determining that a user is a bot based on a repeating pattern of activity in the user's history of user interactions with the client application.

17. The system of claim 11, wherein analyzing the bot signals comprises:
   determining that a user is a bot based on a lack of social interactions with other users in the client application.

18. The system of claim 11, wherein analyzing the bot signals comprises:
   determining that a user is a bot when a client device for the user is associated with an anomalous pattern of calls to an application programming interface for the client application.

19. The system of claim 11, wherein analyzing the bot signals comprises:
   determining that a user is a bot based on a similarity between one of the user's signals and a corresponding signal for a different user.

20. An article, comprising:
   a non-transitory computer-readable medium having instructions stored thereon that, when executed by one or more computer processors, cause the computer processors to perform operations comprising:
   providing a client application to a plurality of users;
   obtaining device-based data and application-based data for each user, the device-based data comprising a description of at least one computer component used to run the client application, the application-based data comprising a history of user interactions with the client application;
   aggregating the data to obtain a plurality of bot signals for each user;
   analyzing the bot signals to detect a bot among the plurality of users; and
   preventing the bot from accessing the client application.

* * * * *